United States Patent

Johno et al.

[11] Patent Number: 5,849,341
[45] Date of Patent: Dec. 15, 1998

[54] SEAL STRUCTURE OF RESERVOIR FOR POWDER SLUSH MOLDING APPARATUS

[75] Inventors: Masahiro Johno, Omiya; Yuzo Ushikubo, Shinjuku-ku, both of Japan

[73] Assignee: Kansei Corporation, Omiya, Japan

[21] Appl. No.: 873,942

[22] Filed: Jun. 12, 1997

[30] Foreign Application Priority Data

Jun. 13, 1996 [JP] Japan ................................. 8-152628

[51] Int. Cl.⁶ ................................................. B29C 39/08
[52] U.S. Cl. ........................ 425/425; 264/311; 425/435; 425/DIG. 47
[58] Field of Search .................................. 425/434, 425, 425/435, DIG. 47; 264/310, 311

[56] References Cited

U.S. PATENT DOCUMENTS

| | | | |
|---|---|---|---|
| 2,798,257 | 7/1957 | Beare | 425/DIG. 47 |
| 2,893,058 | 7/1959 | Wurtz et al. | 425/DIG. 47 |
| 4,925,151 | 5/1990 | Gray | 264/310 |
| 5,074,773 | 12/1991 | Tischler | 264/310 |
| 5,316,715 | 5/1994 | Gray | 425/435 |

FOREIGN PATENT DOCUMENTS

| | | |
|---|---|---|
| 62-144913 | 6/1987 | Japan . |
| 2-99307 | 4/1990 | Japan . |

*Primary Examiner*—Patrick Ryan
*Assistant Examiner*—Joseph Leyson
*Attorney, Agent, or Firm*—Jacobson, Price, Holman & Stern, PLLC

[57] ABSTRACT

A powder slush molding apparatus comprises a reservoir (4) containing a powder material (8) used as material for the powder slush molding apparatus and having a sealing member (21) on an end portion of a powder material introduction opening (6), and a metal mold (1) which is maintained at a high temperature and is coupled to the reservoir (4) for forming a skin molding by melting the powder material (8) poured from the reservoir (4) while rotating the reservoir (4). In the powder slush molding apparatus, the sealing member (21) comprises a seal tube (23) tubular in section which is fixed along the end portion of the powder material introduction opening (6) and a stringlike seal inner member (24) which is inserted in the seal tube (23).

9 Claims, 5 Drawing Sheets

SEAL STRUCTURE OF RESERVOIR FOR POWDER SLUSH MOLDING APPARATUS

BACKGROUND OF THE INVENTION

1. Field of the Invention

This invention relates to a seal structure of a reservoir for a powder slush molding apparatus that comprises the reservoir containing a powder material used as a material for the powder slush molding apparatus and having a sealing member on an end portion of a powder material introduction opening and a metal mold maintained at a high temperature and coupled to the reservoir for forming a skin molding by melting the powder material poured from the reservoir while rotating the reservoir.

2. Description of the Prior Art

As shown in FIGS. 5 to 8, there has been known a conventional seal structure of a reservoir for a powder slush molding apparatus.

FIG. 5 is a perspective view of a metal mold and the reservoir containing a powder material.

The metal mold designated by reference character 1 in FIG. 5 has a frame 3 attached to and enclosing a metal mold body 2. The metal mold 1 is constructed to not only be reinforced but also be rotated and oscillated by the attachment of the frame 3.

The reservoir designated by reference character 4 comprises a container 5 for the powder material and powder material introduction openings 6 disposed on the container 5 which each communicate with the inside of the container 5.

On an end portion 6a of the powder material introduction opening 6, a sealing member 7 is provided which comes into contact with a part in the vicinity of the periphery of each of product-formation surfaces 2a of the metal mold body 2 (see FIG. 6(a)).

In this conventional embodiment, the powder slush molding apparatus has first and second powder material introduction openings 6x, 6y so as to produce two molded products at a time by the powder slush molding.

FIG. 6(a) is a sectional view of a main part of the powder slush molding apparatus in which the reservoir 4 has been attached to the metal mold 1 reinforced with the frame 3. FIG. 6(b) is an enlarged perspective view of the sealing member 7.

As shown in FIG. 6(a), the metal mold 1 heated and maintained at a high temperature is combined with the reservoir 4, and the sealing member 7 mounted on the end portion 6a of the powder material introduction opening 6 is constructed to come into contact with the surface of the metal mold body 2 so as not to leak the powder material 8.

As shown in FIG. 6(b), a sealing material 7a, out of which the sealing member 7 is made, has an oval cross section and shoulder portions 7a1 in the lower part. The sealing material 7a is mounted on and fixed to the end portion 6a of the powder material introduction opening 6 such that claws 7b2 of fixing plates 7b arranged at intervals press the shoulder portions 7a1 of the sealing material 7a from both sides and fix them to the end portion 6a by means of bolts 7c, washers 7c1, and nuts 7c2 through long holes 7b1 of the fixing plates 7b.

FIG. 7 is a sectional view of the main part of the powder slush molding apparatus, showing a state where the metal mold 1 reinforced with the frame 3 and the reservoir 4 combined with the metal mold 1 are rotated to be placed upside down so that the powder material 8 in the container 5 is poured from the powder material introduction opening 6 into the metal mold body 2 positioned at the lower side.

In the state where the metal mold 1 is turned upside down and is positioned at the lower side whereas the reservoir 4 is positioned at the upper side, the powder material 8 is poured from the reservoir 4 to the inner surface of the metal mold body 2. At this time, the sealing material 7a of the sealing member 7 stops the powder material 8 from leaking outside unless the sealing material 7a deteriorates and is deformed with heat.

In this state, the powder slush molding apparatus is oscillated to fit the powder material 8 on the inner surface of the metal mold body 2 and melt it to grow substantially uniform in thickness. The powder slush molding for forming a skin object is carried out in this way. Subsequently, the metal mold 1 and the reservoir 4 are returned to the state where the metal mold 1 is positioned at the upper side, as shown in FIG. 6(a), and then are separated from each other. Thereafter, the metal mold 1 is postheated and cooled to peel a molded skin off the inner surface of the metal mold body 2, and the skin forming is completed. This operation is repeated to produce the skin objects under the powder slush molding.

FIG. 8 is a partially sectional view of the seal structure of the apparatus, showing a state where the powder material 8 has leaked outside the sealing member 7 because the powder slush molding is repeatedly carried out and, as a result, the sealing material 7a of the sealing member 7 undergoes thermal degradation to such an extent as to lose its resiliency and sealing property.

The sealing material 7a is made of silicone rubber having high thermal resistance and is foamed in order to obtain elasticity and flexibility.

However, in this conventional seal structure, by repeatedly receiving an intense heat from the metal mold body 2 heated and maintained at a high temperature, the sealing material 7a deteriorates and is liable to be deformed by pressure, and finally loses its restitutive force. Additionally, since the sealing member 7 is formed by foaming in order to obtain elasticity and flexibility, the sealing member 7 shows a marked tendency to deteriorate rapidly. Therefore, once the powder material 8 has leaked outside the sealing member 7, the powder material 8 is directly melted and carbonized because the quantity of the powder material 8 which has leaked is smaller than that of the powder material 8 remaining on the product-formation surface 2a.

In the following step (not shown), when the metal mold 1 is detached from the reservoir 4 and is postheated in a state where the skin object is left in the metal mold body 2, the leaked powder material 8a which has adhered to the outside of the sealing member 7 and has been carbonized might drop onto and adhere to the product-formation surface 2a or mix with the skin object. As a result, disadvantageously, inferior skin objects are produced by the powder slush molding.

SUMMARY OF THE INVENTION

An object of the present invention is to provide a sealing material superior in thermal resistance, and a seal structure which is capable of enhancing a sealing function.

A powder slush molding apparatus according to an aspect of the present invention comprises a reservoir containing a powder material used as a material for the powder slush molding apparatus and having a sealing member on an end portion of a powder material introduction opening, and a metal mold maintained at a high temperature and attached to the reservoir for pouring the powder material into the metal mold while rotating the reservoir and melting the powder material so as to produce a skin molding. In the powder slush molding apparatus, the sealing member comprises a seal tube having a tubular cross section which is fixed along the end portion of the powder material introduction opening, and a stringlike seal inner member which is inserted in the seal tube.

According to the aforementioned construction, the two constituent parts of the sealing member can perform two functions of thermal resistance and elasticity which are required for a seal structure, respectively. Therefore, a conventional construction is not required in which one constituent part concurrently has the two conflicting functions.

Another feature of the present invention is that, in the seal structure, the seal tube is made of a solid resin material having superior thermal resistance, and the seal inner member is made of a foamed resin material having superior elasticity.

Accordingly, a solid resin material having a high physical property value can be selected for the seal tube which is required to have superior thermal resistance because of contact with the intensely heated metal mold. Therefore, the seal inner member which is shielded thermally with the seal tube can retain superior elasticity even if a foamed resin material having inferior thermal resistance and superior elasticity is selected for the seal inner member.

Still another feature of the present invention is that, in the seal structure, a gap is generated between the seal inner member inserted in the seal tube and the inner circumferential surface of the seal tube.

According to this construction, air serving as a thermally less-conductive substance can be admitted to the gap between the circumferential inner surface of the seal tube and the seal inner member.

Still another feature of the present invention is that, in the seal structure, a plurality of grooves are formed in the outer circumferential surface of the seal inner member, and/or at least one through-hole is formed in the sectional part thereof.

According to this construction, the grooves and/or through-hole make it possible to obtain a larger volume for air serving as a thermally less-conductive substance, and obtain a good shielding effect on heat from the metal mold.

As a result, the seal tube or the seal inner member undergoes less deterioration in thermal resistance. In addition, the grooves or the through-hole heightens the flexibility of the sealing member and enables the sealing member to be attached more easily.

Still another feature of the present invention is that, in the seal structure, at least one part of the seal tube is cut, and a joint portion for the connection thereof is formed in a configuration of a surface to be sealed in which the powder material introduction opening has a large difference in level or has an acute bend angle, or a part of the sealing member runs in a substantially T-shaped state against another part thereof.

According to this construction, even if the sealed surface has a rough configuration in undulation, the sealing member can be cut to be fitted on the surface to be sealed. Therefore, the sealing member can be fixed without deforming the cross section of the sealing member.

In the foregoing, the sealing material is made of silicone rubber which has the highest level of thermal resistance of all the rubber elastic materials. The seal tube of the sealing member is designed to have high thermal resistance as a solid, whereas the seal inner member is designed to have large elastic force as a foamed material. The seal inner member is inserted in the seal tube so that the sealing material has both functions of thermal resistance and elasticity.

BRIEF DESCRIPTION OF THE DRAWINGS

FIG. 4(a') is a sectional view of a seal tube having another shape according to the second embodiment.

DETAILED DESCRIPTION OF THE EMBODIMENTS (First Embodiment)

A first embodiment of the present invention will be hereinafter described with reference to FIGS. 1, 2, and 3(a) to 3(d). In this embodiment, the same numerals are each given to the same or equivalent constituent parts as those of the conventional seal structure.

Figure 1:
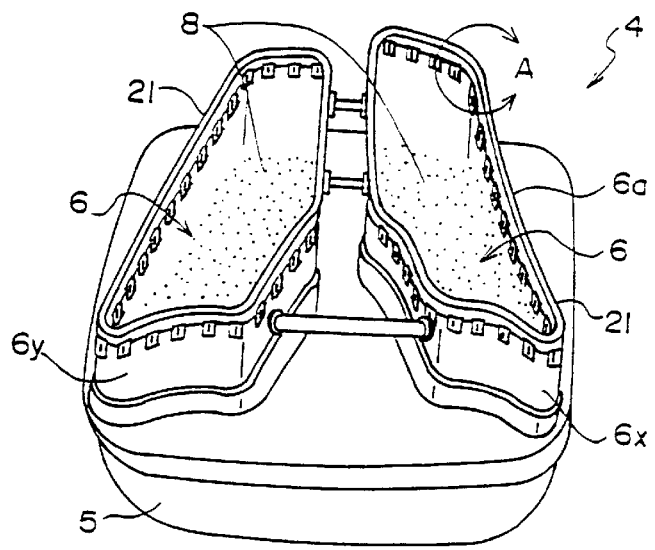
FIG. 1 is a perspective view of a seal structure of a reservoir for a powder slush molding apparatus according to a first embodiment of the present invention.

FIG. 1 is a perspective view of a reservoir of a powder material for a powder slush skin.

Figure 2:
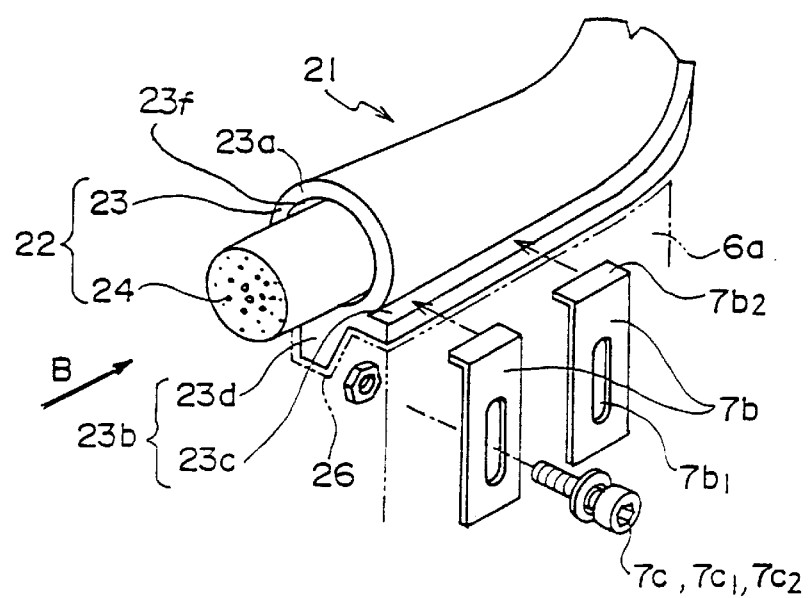
FIG. 2 is a perspective view of part A shown in FIG. 1.

FIG. 2 is an enlarged perspective view of a part A of a sealing member shown in FIG. 1.

FIGS. 3(a) to 3(d) are a perspective view and sectional views, each showing a joint portion where cut parts of a seal member are joined to each other.

In the construction shown in FIG. 1, reference character 4 designates a reservoir, reference character 5 designates a container for a powder material, and reference characters 6x and 6y are first and second powder material introduction openings, respectively. The first and second powder material introduction openings 6x, 6y are connected to the powder material container 5. A sealing member 21 is attached to an end portion 6a of each of the powder material introduction openings 6x, 6y. The sealing member 21 comes into contact with a metal mold (not shown) so as not to leak a powder material 8 outside.

As shown in FIG. 2, the sealing member 21 is made up of a sealing material 22 and fixing plates 7b. The fixing plates 7b each have a long hole 7b1 and a claw portion 7b2. The sealing material 22 is fixed to the end portion 6a of the powder material introduction opening by means of the fixing plates 7b to each of which a bolt 7c, a washer 7c1, and a nut 7c2 are attached through the long hole 7b1.

The sealing material 22 comprises a seal tube 23 tubular in section and a seal inner member 24 inserted in the seal tube 23. The seal tube 23 comprises a tubular portion 23a and a fixation portion 23b formed integrally with the tubular portion 23a at the lower part of the tubular portion 23a.

The fixation portion 23b comprises a shoulder portion 23c and an anchor portion 23d by both of which a substantially T-shaped cross-section is formed. The anchor portion 23d is fitted into an anchor groove 26 formed in the end portion 6a of the powder material introduction opening 6 over the full length thereof, and the shoulder portion 23c is pressed and fixed by the claw portions 7b2 of the fixing plates 7b.

The seal inner member 24 is stringlike and has a substantially circular cross-section. The seal inner member 24 is thickened to such an extent as to generate a proper gap between the seal inner member 24 and the inner wall surface of the tubular portion 23a of the seal tube 23, and is inserted in the seal tube 23 over the whole length thereof.

Figures 3A, 3B:
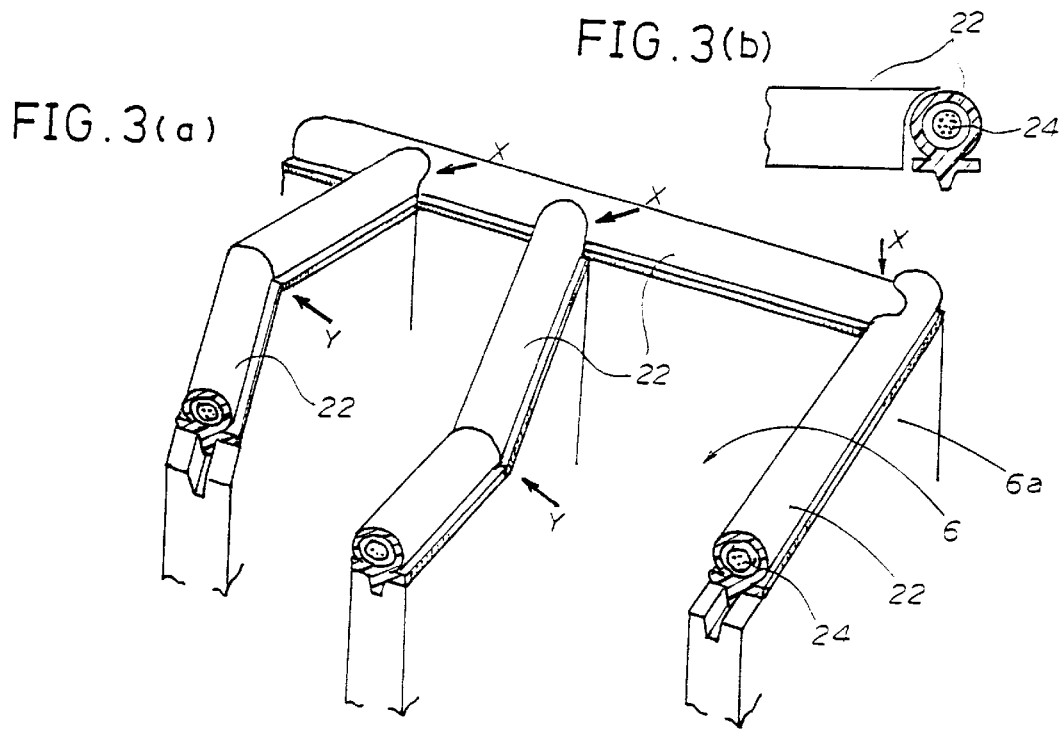
FIG. 3(a) is a perspective view of joint portions of sealing members mounted on an end portion of a powder material introduction opening.
FIG. 3(b) is a sectional view of a butt joint portion shown by arrow X in FIG. 3 (a).

In FIG. 3(a), arrow X shows a state of the sealing member which runs, in a T-shape, against the corner part of the end portion 6a of the powder material introduction opening. In this state, an end surface of the sealing material 22, which has come into contact with a side surface of another sealing material 22, is cut to be fitted on the side surface thereof and is connected thereto (see FIG. 3(b)).

Arrow Y of FIG. 3(a) shows sealed parts of the end portion 6a of the powder material introduction opening which have large convex and concave configurations.

At the sealed parts, the sealing material 22 is cut, and then cut-parts are placed opposite and are joined to each other in directions of x and x'. In this way, the sealing material 22 is fitted and fixed to the concave and convex of the end portion 6a of the powder material introduction opening (see FIG. 3(c)).

Figure 3C:
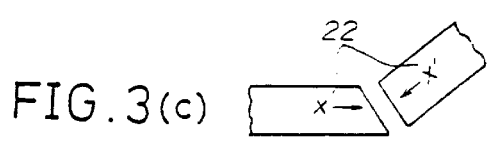
FIG. 3(c) is a sectional view of a joint portion shown by arrow Y in FIG. 3(a), where the seal member is cut into two parts and joined together.
Figure 3D:
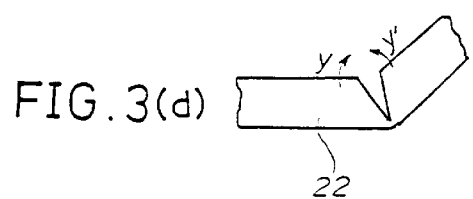
FIG. 3(d) is a sectional view of a joint portion shown by arrow Y, where the seal member is partially cut and joined together.

Alternatively, in order to fit and fix the sealing material 22 to the concave and convex of the end portion 6a of the powder material introduction opening, a part of the sealing material 22 is cut (notched), and then the sealing material 22 is bent in directions of y and y' to join cut-parts to each other (see FIG. 3(d)).

In the constructions shown in FIGS. 3(c) and 3(d), a heat-resisting silicone adhesive agent having the same level of thermal resistance and elasticity as that of the sealing material 22 may be applied on the cut parts of the sealing material 22.

The operation in the first embodiment will now be described.

When the metal mold 1 is coupled to the reservoir 4, the seal tube 23 of the sealing member 21 attached to the end portion 6a of the powder material introduction opening 6 comes into contact with the metal mold 1 and then is pressed and deformed, and, as a result, the seal inner member 24 is also deformed. Thus, sealing is achieved by the repulsive force generated in the seal inner member 24 having elasticity, so that the powder material 8 can be prevented from being leaked outside.

At this time, air, one of thermally less-conductive substances, is in a space between the seal tube 23 and the seal inner member 24, and exercises an adiabatic effect.

Accordingly, the sealing member undergoes less thermal degradation, and therefore the initial properties thereof can be retained. Thus, the life of the sealing member can be lengthened, and, in addition, the sealing property is enhanced, so that the powder material can be prevented from being leaked from the sealing member. Additionally, since the sealing member is bent easily in a space between the seal tube and the seal inner member, the sealing member can be easily fitted and fixed.

Additionally, since the seal tube 23 in contact with the metal mold body 2 is shaped solidly, the seal tube 23 has superior thermal resistance. Additionally, since this contact surface is also cooled by the air inside the seal tube 23, thermal degradation thereof is small even if the seal tube 23 receives intense heat from the metal mold heated and maintained at a high-temperature. As a result, the initial properties thereof can be retained longer, and thus the life thereof is lengthened, and the sealing property is retained longer.

Additionally, in the sealing member mounted on the powder material introduction opening, the sealing material is cut to be fitted on the surface to be sealed, and cut-parts are joined together. Alternatively, the sealing material is notched and bent to form a joint portion.

Accordingly, even if the end portion of the powder material introduction opening has a large difference in level or an acute bent angle, or even if parts to be sealed have a configuration where a sealing member runs in a substantially T-shaped state against another sealing member, it is possible to attach the sealing member to the part to be sealed without deforming the cross section of the seal member, and therefore the sealing member can be constructed to prevent the powder material from leaking outside.

(Second Embodiment)

A second embodiment of the present invention will be hereinafter described with reference to FIGS. 4 (a), 4 (a'), 4 (b), and 4 (c).

Especially, there will be explained the difference between the first and second embodiments. In this embodiment, the same numerals are each given to the same or equivalent constituent parts as those of the conventional seal structure.

Figure 4A:
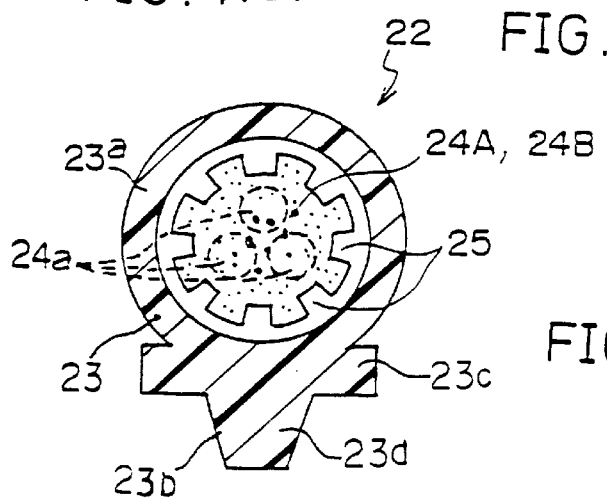
FIG. 4(a) is a sectional view of a seal member according to a second embodiment, seen from a direction of arrow B in FIG. 2.

In FIG. 4(a), reference character 22 designates a sealing material, reference character 23 designates a seal tube, and reference characters 24A and 24B designate seal inner members inserted in a tubular portion 23a of the seal tube 23.

The fixation portion 23b formed integrally with the tubular portion 23a consists of a shoulder portion 23c and an anchor portion 23d, and has a substantially T-shaped cross section. The fixation portion 23b is fixed by fitting the anchor portion 23d into a groove portion of the end portion 6a of the powder material introduction opening 6.

Since the anchor portion 23d is fitted into the anchor groove over the full length thereof, the fixation portion 23b of the seal tube 23 can be firmly fixed following a zigzag line or irregular winding line of the end portion of the powder material introduction opening. Thus, a sealing function can be heightened.

The sealing material 22 has a construction in which the shoulder portion 23c is further pressed and fixed by means of the fixing claws 7b.

As shown in FIG. 4(a'), the sealing material 22 may have a construction in which in the shoulder portion 23c, a groove 23c1 is formed into which the claw 7b2 of the fixing plate 7b is inserted, and the seal tube 23 is fixed to the end portion 6a of the powder material introduction opening by means of the fixing plates 7b.

The seal tube 23 is almost the same in construction as that of the first embodiment, as mentioned above. However, in the second embodiment, a plurality of grooves 25 are formed in the circumferential surface of the stringlike seal inner members 24A, 24B which each have a substantially circular cross section. In addition, as shown by broken lines in the respective cross sections, at least one through-hole 24a can also be formed in the seal inner members 24A, 24B.

Figure 4B:
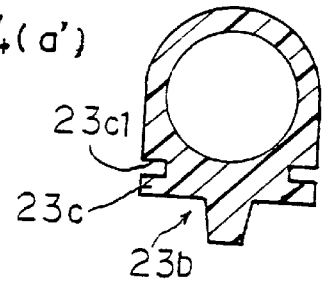
FIG. 4(b) is a perspective view of a seal inner member shown in FIG. 4(a).
Figure 4B:
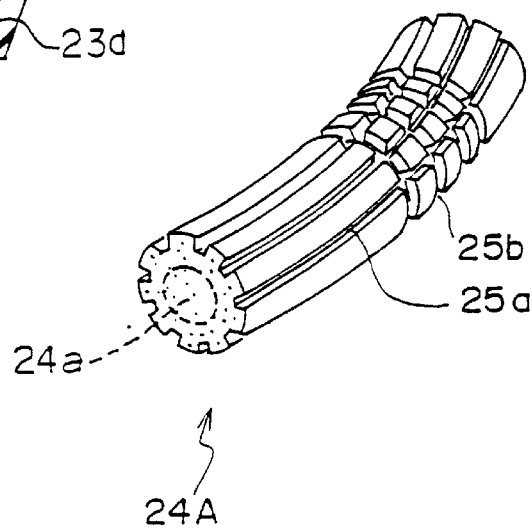

In FIG. 4(b), the plurality of grooves 25 formed in the circumferential surface of the seal inner member 24A are made up of longitudinal grooves 25a and bendable transversal grooves 25b. In addition, as shown by a broken line, a single through-hole 24a is formed in the section of the seal inner member 24A.

Figure 4C:
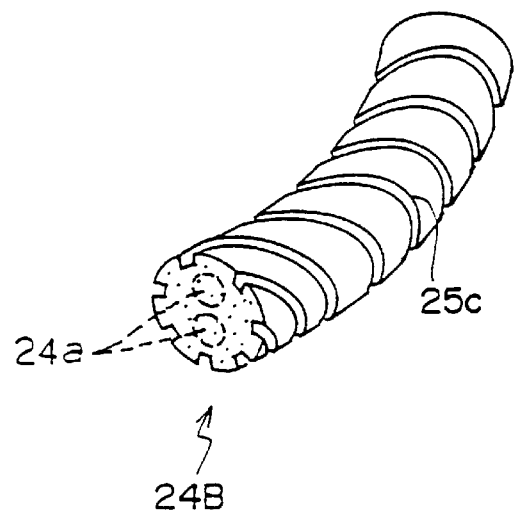
FIG. 4(c) is a perspective view of another seal inner member shown in FIG. 4(a).
Figure 5:
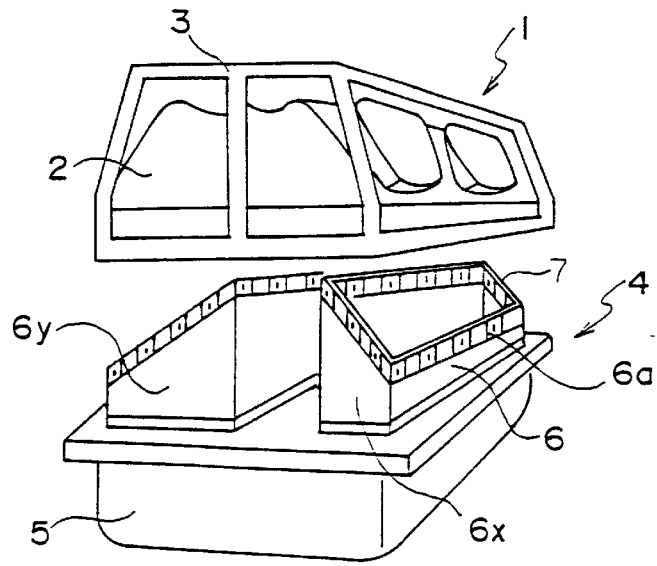
FIG. 5 is a perspective view of a conventional seal structure of a reservoir for a powder slush molding apparatus.
Figure 6A:
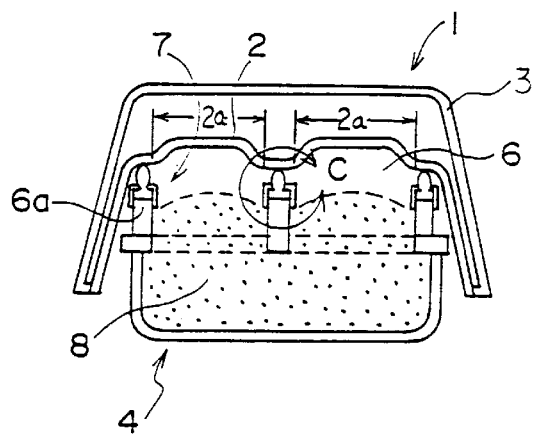
FIG. 6(a) is a sectional view of a main part of a conventional powder slush molding apparatus in which a metal mold is attached to a reservoir.
Figure 6B:
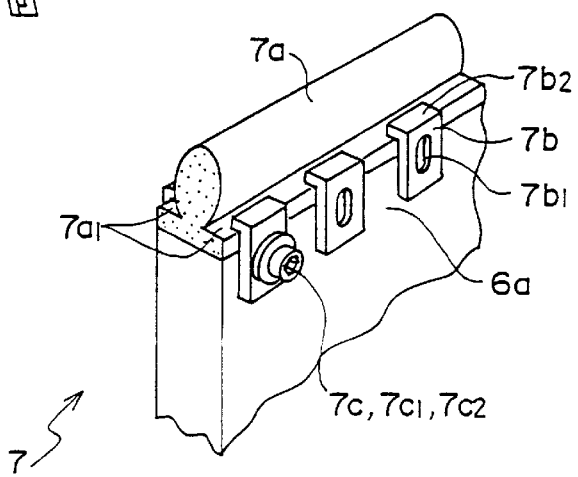
FIG. 6(b) is an enlarged perspective view of part C shown in FIG. 6(a).
Figure 7:
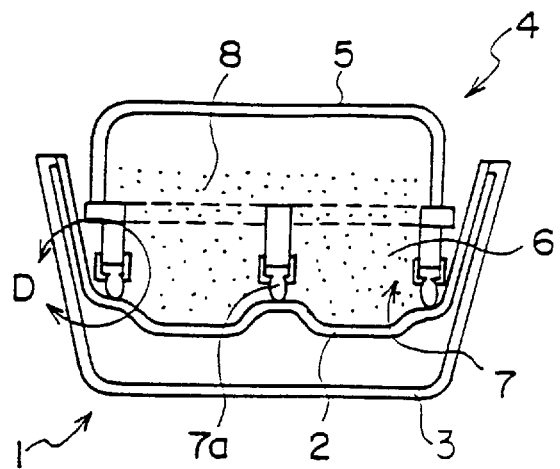
FIG. 7 is a sectional view of a main part of the conventional apparatus, showing a state where the metal mold and the reservoir are turned upside down from the state of FIG. 6(a).
Figure 8:
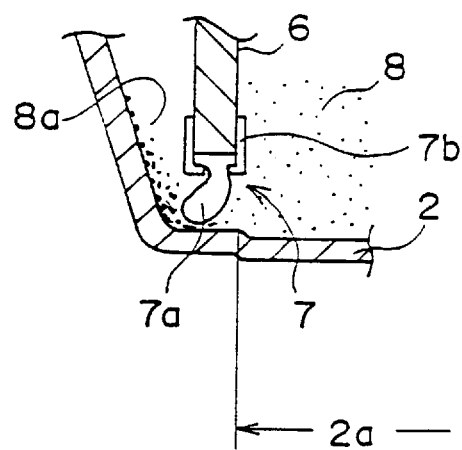
FIG. 8 is a partially sectional view of part D shown in FIG. 7.

FIG. 4(c) is a perspective view of the seal inner member 24B which has a plurality of spiral grooves 25c extending in the longitudinal direction and formed in the outer circumferential surface of the seal inner member 24B whose cross section is substantially circular. As shown by broken lines, two through-holes 24a are formed in the section of the seal inner member 24B.

Since the seal inner members 24A, 24B having the grooves 25 or the through-holes 24a shown in FIGS. 4 (a), 4 (b), and 4 (c) hold air serving as a thermally less-conductive substance inside the grooves 25 or the through-holes 24a, thermal resistance is heightened, and additionally, the sectional area of each of the seal inner members 24A, 24B becomes smaller because of the formation of the grooves 25 or the through-holes 24a, and thus the flexibility thereof is heightened. As a result, the sealing material 22 can be attached more easily. Besides, the seal inner member 24 can have flexibility or elasticity even though it is made solid without being foamed. Thus, the sealing member 7 can be formed as a sealing member having synthetically higher thermal resistance.

Since the other constructions and functions are the same as those of the first embodiment, a description of them will be omitted.

As a result of experiments conducted under the following conditions, a sealing member was obtained which has twice the life of a conventional sealing member.

* material to be used: sealing material
  a seal tube; silicone solid molded rubber with superior thermal resistance of 250° C.–300° C., hardness (Hs) of 50, and
  a seal inner member; silicone foamed rubber with superior thermal resistance, hardness (Hs) of 25, (wherein rubber which is not foamed may be used if it has grooves).
* measurements of configuration:
  a seal tube; inner diameter of 15 mm, thickness of 2.5 mm,
  a seal inner member; outer diameter of 13 mm or 10 mm, and
  a gap between the inner diameter of the seal tube and the outer diameter of the seal inner member;
  2~5 mm (wherein it is 0~5 mm in the seal inner member with grooves).

What is claimed is:

1. A seal structure of a reservoir for a powder slush molding apparatus, said powder slush molding apparatus comprising:
   the reservoir containing a powder material used in said powder slush molding apparatus, said reservoir having a sealing member on an end portion of a powder material introduction opening; and
   a metal mold maintained at a high temperature and combined with said reservoir for forming a skin molding by melting the powder material poured from said reservoir while rotating said reservoir;
   wherein said sealing member comprises a sectionally tubular seal tube which is fixed to said reservoir along said end portion of said powder material introduction opening and a stringy seal inner member which is inserted in said seal tube, the seal tube being made of a solid resin material with thermal resistance, the seal inner member being made of a resin material with resiliency.

2. A seal structure of a reservoir for a powder slush molding apparatus according to claim 1, wherein said solid resin material with thermal resistance and said resin material with resiliency each consist of rubber.

3. A seal structure of a reservoir for a powder slush molding apparatus according to claim 1, wherein said seal inner member is designed to generate a gap between said seal inner member and an inner circumferential surface of said seal tube.

4. A seal structure of a reservoir for a powder slush molding apparatus according to claim 1, wherein said seal inner member has a plurality of grooves in an outer circumferential surface of said seal inner member.

5. A seal structure of a reservoir for a powder slush molding apparatus according to claim 1, wherein said seal inner member has at least one through-hole in a sectional part thereof.

6. A seal structure of a reservoir for a powder slush molding apparatus according to claim 1, wherein said seal inner member has a plurality of grooves in an outer circumferential surface of said seal inner member, and has at least one through-hole in a sectional part thereof.

7. A seal structure of a reservoir for a powder slush molding apparatus according to claim 1, wherein said end portion of said powder material introduction opening has a large difference in level, said seal tube is in parts, and a joint portion for joining the parts of said seal tube is provided.

8. A seal structure of a reservoir for a powder slush molding apparatus according to claim 1, wherein said end portion has an acute bend angle, said seal tube is in parts, and a joint portion for joining the parts of said seal tube is provided.

9. A seal structure of a reservoir for a powder slush molding apparatus according to claim 1, wherein said sealing member comes in contact with another sealing member in a substantially T-shaped state, said seal tube is in parts, and a joint portion for joining the parts of said seal tube is provided.

* * * * *